United States Patent [19]

Frötschner et al.

[11] Patent Number: 4,704,864

[45] Date of Patent: Nov. 10, 1987

[54] SPOKE ARRANGEMENT FOR A HYDRODYNAMIC TORQUE CONVERTER

[75] Inventors: Eberhard Frötschner, Gerlingen; Otto Wörner, Reutlingen, both of Fed. Rep. of Germany

[73] Assignee: Daimler-Benz Aktiengesellschaft, Stuttgart, Fed. Rep. of Germany

[21] Appl. No.: 906,400

[22] Filed: Sep. 4, 1986

[30] Foreign Application Priority Data

Sep. 4, 1985 [DE] Fed. Rep. of Germany ....... 3531520

[51] Int. Cl.⁴ ...................... F16D 33/00; F16H 55/40
[52] U.S. Cl. .......................................... 60/330; 74/446; 474/195
[58] Field of Search .......................... 60/330; 137/15.1; 474/195; 74/730, 446

[56] References Cited

U.S. PATENT DOCUMENTS

| | | | |
|---|---|---|---|
| 2,919,607 | 1/1960 | Moore | 74/688 |
| 3,101,011 | 8/1963 | Tuck et al. | 74/732 |
| 3,188,887 | 6/1965 | Gabriel | 74/688 |
| 3,425,295 | 2/1969 | Galaniuk | 74/677 |
| 3,908,683 | 9/1975 | Demetrick | 137/15.1 |

FOREIGN PATENT DOCUMENTS 2359895 6/1974 Fed. Rep. of Germany .
0227403 1/1925 United Kingdom .

Primary Examiner—William E. Wayner
Attorney, Agent, or Firm—Barnes & Thornburg

[57] ABSTRACT

In a spoked drive wheel for a hydrodynamic torque converter operating with power splitting, having a spoke for connecting a wheel hub to an external ring of the spoked drive wheel, the spoke cross-section is designed in the shape of a wing profile extending along a profile main axis. The profile main axis is transverse to the axis of rotation of the wheel. In this way, the deterioration in the characteristics of the torque converter is kept as small as possible in both power splitting operation and in operation without power splitting.

17 Claims, 4 Drawing Figures

SPOKE ARRANGEMENT FOR A HYDRODYNAMIC TORQUE CONVERTER

BACKGROUND AND SUMMARY OF THE INVENTION

The invention concerns a spoke connecting a wheel hub to an external ring of a spoked drive wheel.

In a known hydrodynamic torque converter, for example U.S. Pat. No. 3,101,011, operation with power splitting is only envision for the fluid coupling range. Namely, the second output shaft of the torque converter, driven by the pump wheel via the spoked drive wheel, only transmit a proportion of the drive power in the highest gear when the turbine wheel and the pump wheel have approximately the same rotational speed, allowance being made for the relative slip. The publication gives no further details of the spoke cross-section of the known spokes of the spoked drive wheel of this torque converter. It is only the representation in the drawing which suggests a circular shape which obviously makes allowance for the varying incident flow directions during the transition between the converter and fluid coupling ranges.

Starting from the fact that the spoke always represents a perturbation factor for the flow in the hydrodynamic working cycle, the object on which the invention is based consists essentially of designing a spoke for hydrodynamic torque converter in such a way that the loads due to the torque transmitted and the centrifugal forces can be kept as small as possible.

The object described is achieved, according to the invention, by providing the spokes to have a wing shaped cross sectional profile along a profile axis transverse to the axis of rotation of the wheel.

By including the profile main axis at an acute angle of incidence relative to a plane perpendicular to the axis of rotation, a minimum flow resistance is obtained over the wole of the rotational speed ratio of the converter.

By inclining the spoke axis between radially outer and inner ends at an acute sweep-back angle relative to the radius of the wheel, the loads arising from the torque transmission, on the one hand, and the centrifugal forces, on the other, are mutually balanced at the smallest possible flow losses.

The edge of the profile are tapered to keep the flow losses small.

The edges of the profile have a minimum width in order not to endanger handling during assembly because of excessive sharpness of the profile ends.

The perturbing influence, on the flow through the spoked drive wheel, is limited to a tolerable amount by limiting the number of spokes.

High strength and stiffness are achieved at the connecting points of the spoked drive wheel to the pump wheel of the torque converter by providing fastening eyes in an external ring adjacent the end of the spoke.

Further objects, features, and advantages of the present invention will become more apparent from the following description when taken with the accompanying drawings which show, for purposes of illustration only, an embodiment in accordance with the present invention.

DETAILED DESCRIPTION OF THE DRAWINGS

Figure 1:
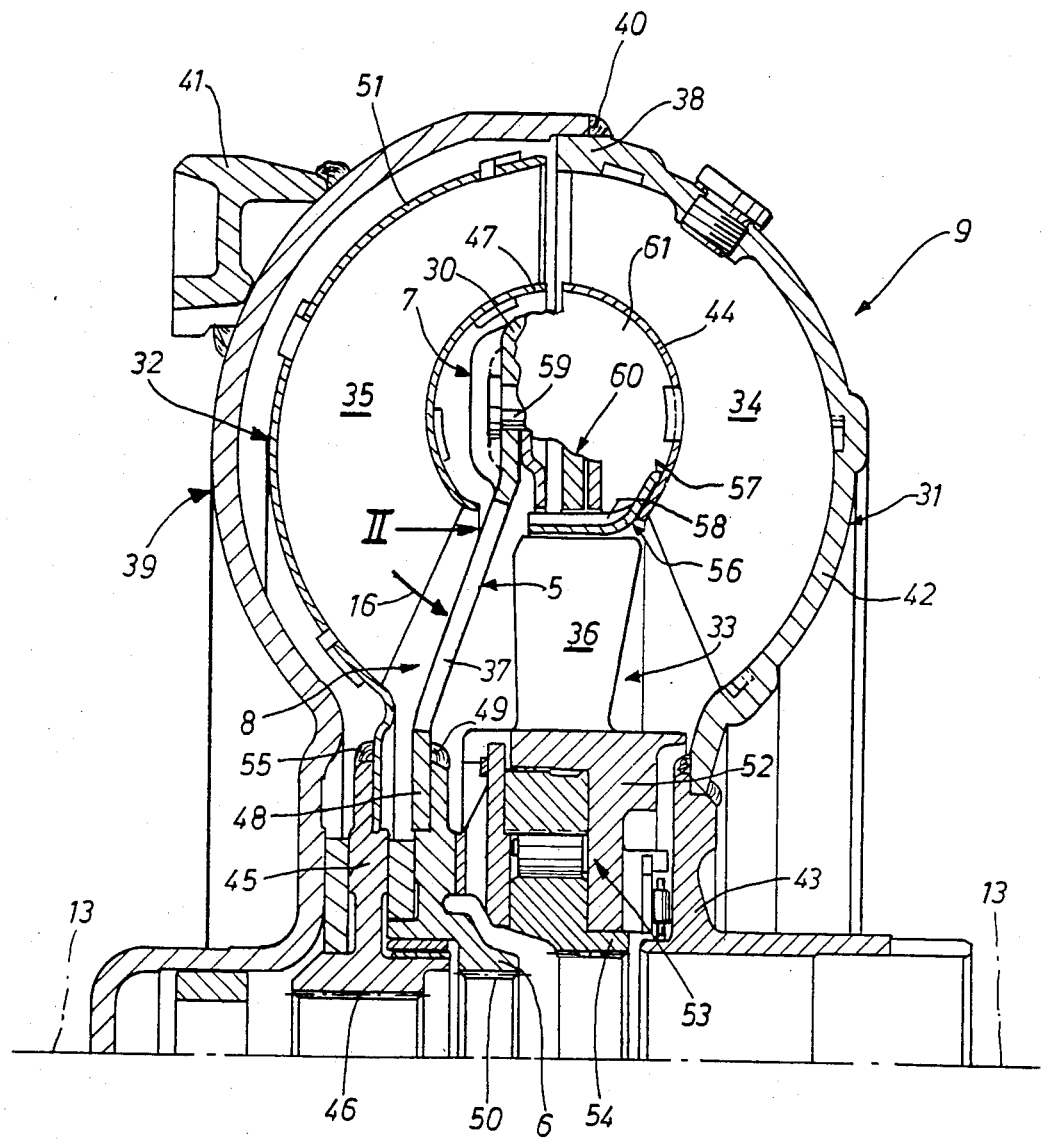
FIG. 1 is a cross-sectional view through a hydrodynamic torque converter having a spoked drive wheel with spokes according to present invention.

A hydrodynamic torque converter 9 has a pump wheel 31 centered about its axis of rotation 13—13, a centered turbine wheel 32, a centered guide wheel 33 and a spoked drive wheel 8 located between the guide wheel 33 and the turbine wheel 32.

In order to restrain its pump wheel vanes 34, the pump wheel 31 has an outer shell 42 with a hub 43 and an inner shell 44. The outer shell 42 is provided with a connection flange 38 at its radially outer end and this connection flange is welded by means of a welded connection 40, so that it is rotationally solid and pressure-tight, to a driving shell 39 covering the turbine wheel 32. The driving shell is provided with fastening eyes 41 for its rotationally solid connection to a driving shaft-for example with a crankshaft of an internal combustion engine.

To retain its turbine wheel vanes 35, the turbine wheel 32 has an inner shell 47 and an outer shell 51. The outer shell 51 is rotationally solidly connected to a turbine wheel hub 45 by means of a welded connection 55. The turbine wheel hub can be coupled to a first output shaft of the torque converter 9 by means of a splined connection 46.

To retain its guide wheel vanes 36, the guide wheel 33 has a guide wheel hub 52 which is connected via a free-wheel clutch 53 to a stator hub 54 which can be fixed to the casing by means of a stator shaft in known manner so that it cannot rotate.

The spoked drive wheel 8 includes flow openings 37 for the working medium of the hydrodynamic working cycle and an inner flange 48 which is rotationally solidly connected to a wheel hub 6 by means of a welded connection 49. The wheel hub 6 can be rotationally solidly connected to a second output shaft of the torque converter 9 by means of splined connection 50.

The inner shells 44 and 47 and the outer edges of the guide wheel vanes 36 enclose an internal toroid 61 in which are located an external ring 7 of the spoked drive wheel 8, a drive ring 56 centered with the axis of rotation 13—13 and a rotationally sprung connection 60, which is only indicated, between the external ring 7 and the drive ring 56.

The external ring 7 and the inner flange 48 are mutually connected by eight spokes 5 defining the flow openings 37 in the peripheral directions. The drive ring 56 is rotationally solidly welded to the radially inner end of the internal shell 44 at 57 and is provided with an axial splined connection 58.

The external ring 7 is provided with four fastening eyes 30 each located in the region of the radially outer spoke end 17 of one of the spokes 5, by means of each of which fastening eyes a support pin 59 is riveted so that it cannot move.

The spline 58 forms the vibration exciting part connected to the pump wheel 31 and the pin 59 forms the part of the rotationally sprung connection 60 connected to the spoked drive wheel 8 and which has to be uncoupled from the vibrations.

Figure 2:
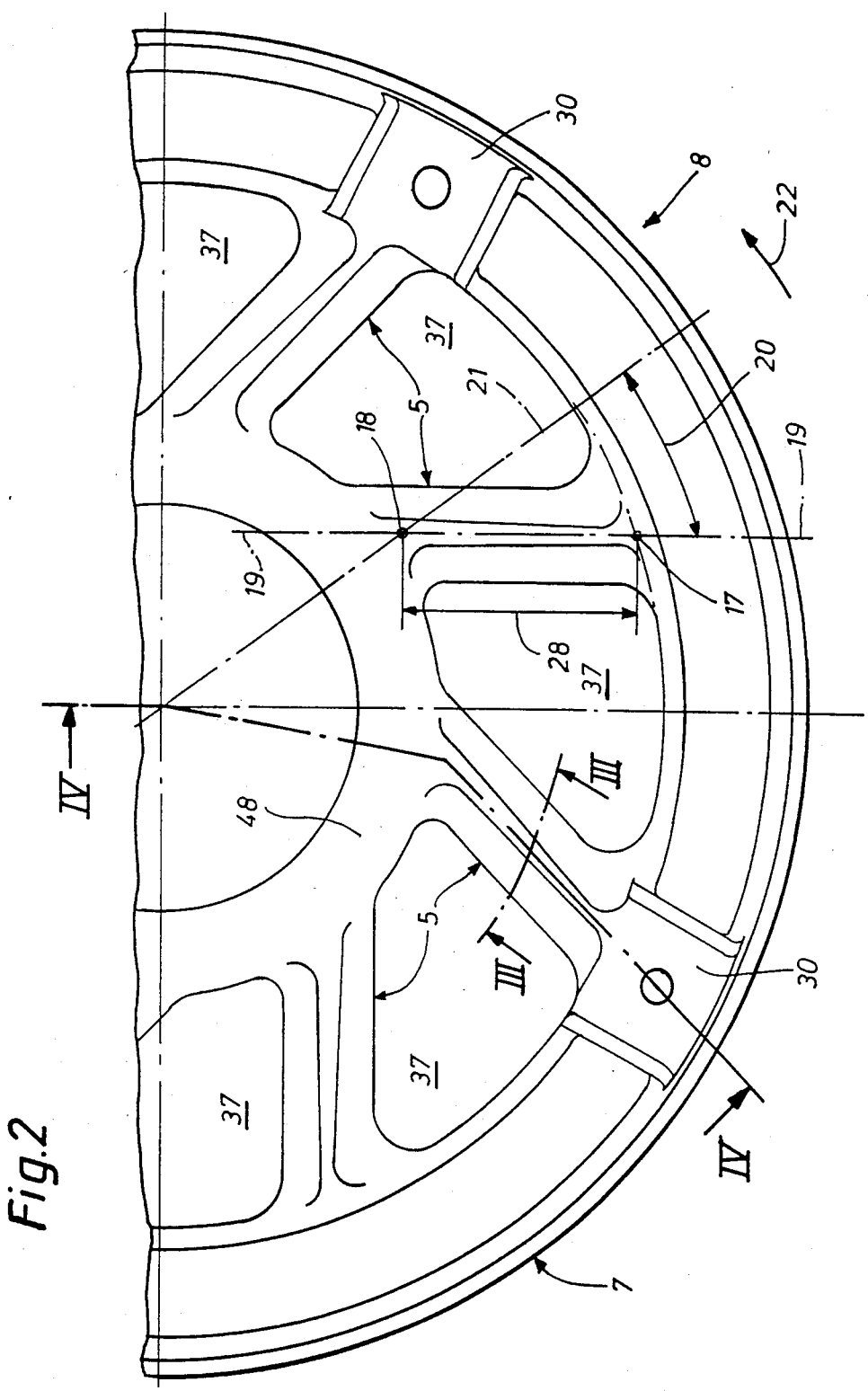
FIG. 2 is an end view of half of the spoked drive wheel of FIG. 1 shown in the direction of the arrow II.

Each spoke 5 has a straight rod shape and is therefore, with its cross-section 10 in the shape of a wing profile 12 (FIG. 3), located centrally about its spoke axis 19—19 over its total length 28 between its radially outer spoke end 17 and its radially inner spoke end 18 as illustrated in FIG. 2. The external ring 7 and the internal flange 48 are mutually offset in the directions of the axis of rotation 13—13 so that each spoke axis 19—19 is located on a conical surface having a base perpendicular to the axis of rotation 13—13 with a cone angle 62 of 20° illustrated in FIG. 4. The spoke axis 19—19 is inclined by a sweep-back angle 20 of smaller than 45° and preferably 35° in the drive rotational direction 22 relative to the radials 21 erected through the inner spoke end 18 as illustrated in FIG. 2.

Figure 3:
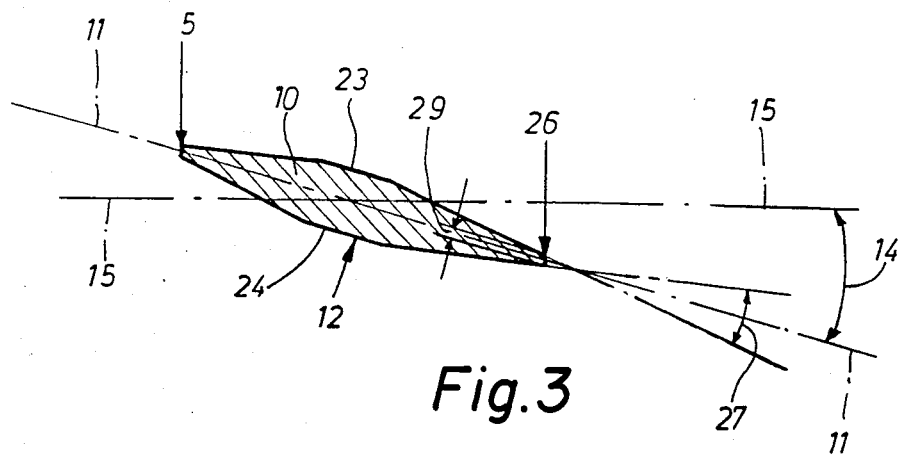
FIG. 3 is a cross-sectional view, through one of the spokes of the spoked drive wheel of FIG. 1, along the line III—III in FIG. 2 but at right angles to the line IIIA—IIIA in FIG. 4.
Figure 4:
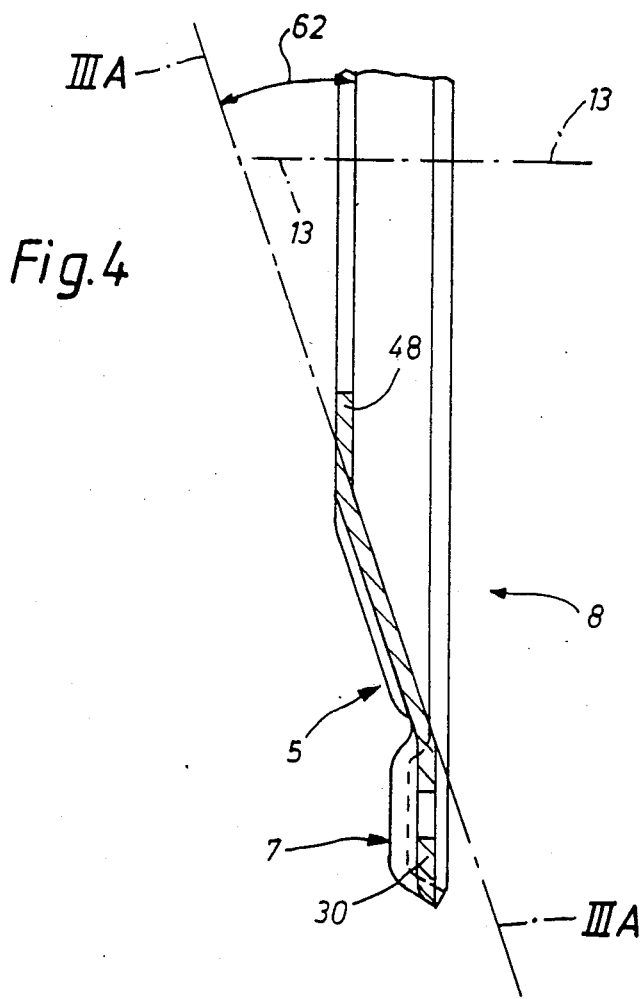
FIG. 4 is a cross-sectional view of half of the spoked drive wheel of FIG. 1 along the line IV—IV in FIG. 2.

The wing profile 12, as illustrated in FIG. 3, is designed symmetrically about a profile main axis 11—11 which is set at an acute angle of incidence 14 of smaller than 20° and preferably 15° relative to a plane 15—15 which is perpendicular to the axis of rotation 13—13 and transverse the incident flow direction 16 of (FIG. 1). The spoke cross-section 10 has a cutting edge shape at its profile ends 25 and 26, the side surfaces 23 and 24 in these regions being at a mutual edge angle 27 of smaller than the 20° and preferably 16°. The profile ends 25 and 26 are flattened to a spoke width 29 of smaller than 2 mm and preferably 0.8 mm.

Each second spoke 5 becomes fastening eye 30 at its radially outer spoke end.

The cutting edge shape 25, 26 and angle of incidence 14 of the wing profile 12 ensures that the flow resistance is kept as small as possible over the whole range of the rotational speed ratio of the torque converter. The compressive loads resulting from the torques and the tensile loads resulting from the centrifugal forces in the spokes 5 practically balances each other out. The sweep-back angle 20 makes a contribution to this effect.

An angle of incidence 14 of 15° has been found advantageous in conjunction with an outlet angle from the turbine blade of 25°. At other outlet angles, which can, for example, lie between 20° and 40°, it is advantageous to design the angle of incidence 14 at an appropriate value between 14° and 20°.

Although the present invention has been described and illustrated in detail, it is to be clearly understood that the same is by way of illustration and example only, and is not to be taken by way of limitation. The spirit and scope of the present invention are to be limted only by the terms of the appended claims.

What is claimed is:

1. In a spoked drive wheel having spoke for connecting a wheel hub to an external ring of a spoked drive wheel for a hydrodynamic torque converter operating with power splitting, comprising:
    the spoke having cross-section extending along a profile main axis in the shape of a wing profile and the profile main axis being transverse to the axis of rotation of the wheel; and
    wherein the profile main axis is set at an acute angle of incidence relative to a plane perpendicular to the axis of rotation and transverse to the incident flow direction of fluids in the torque converter.

2. A spoked drive wheel according to claim 1, wherein the angle of incidence is smaller than 20°.

3. A spoked drive wheel according to claim 2, wherein the angle of incidence is approximately 15°.

4. A spoked drive wheel according to claim 3, wherein the spoke axis, between the raidally outer and radially inner spoke ends, is inclined at an acute sweep-back angle relative to the radius of the wheel in the direction of rotation of the wheel.

5. A spoked drive wheel according to claim 4, wherein the sweep-back angle is smaller than 45°.

6. A spoked drive wheel according to claim 5, wherein the sweep-back angle is approximately 35°.

7. A spoked drive wheel according to claim 1, wherein the spoke cross-section is symmetrical about the profile main axis.

8. A spoked drive wheel according to claim 1, wherein the spoke cross-section is centered on the spoke axis over substantially the length whole of the spoke.

9. A spoked drive wheel according to claim 1, wherein the number of spokes is not more than eight.

10. A spoked drive wheel according to claim 1, wherein the spoke width measured transverse to the profile main axis is smaller than 2 mm on at least one of the two profile ends.

11. A spoked drive wheel according to claim 10 wherein the spoke width is approximately 0.8 mm.

12. In a spoked drive wheel having spoke for connecting a wheel hub to an external ring of a spoked drive wheel for a hydrodynamic torque converter operating with power splitting, comprising:
    the spoke having cross-section extending along a profile main axis in the shape of a wing profile and the profile main axis being transverse to the axis of rotation of the wheel;
    wherein the two side surfaces of the spoke cross-section have an acute edge angle in the region of at least one of the profile ends; and
    wherein the edge angle is smaller than 20°.

13. A spoked drive wheel according to claim 12, wherein the edge angle is approximately 16°.

14. In a spoked drive wheel having spoke for connecting a wheel hub to an external ring of a spoked drive wheel for a hydrodynamic torque converter operating with power splitting, comprising:
    the spoke having cross-section extending along a profile main axis in the shape of a wing profile and the profile main axis being transverse to the axis of rotation of the wheel;
    wherein the two side surfaces of the spoke cross-section have an acute edge angle in the region of at least one of the profile ends; and
    wherein the spoke width measured transverse to the profile main axis is smaller than 2 mm on at least one of the two profile ends.

15. A spoked drive wheel according to claim 14, wherein the spoke width is approximately 0.8 mm.

16. In a spoked drive wheel having spoke for connecting a wheel hub to an external ring of a spoked drive wheel for a hydrodynamic torque converter operating with power splitting, comprising:
    the spoke having cross-section extending along a profile main axis in the shape of a wing profile and the profile main axis being transverse to the axis of rotation of the wheel; and including an external ring having a fastening eye on at leat one spoke in the region of the radially outer spoke end.

17. In a spoked drive wheel having spoke for connecting a wheel hub to an external ring of a spoked drive wheel for a hydrodynamic torque converter operating with power splitting, comprising:

the spoke having cross-section extending along a profile main axis in the shape of a wing profile and the profile main axis being transverse to the axis of rotation of the wheel; and wherein the spoke axis between the radially outer and radially inner spoke ends is inclined at an acute sweep-back angle relative to the radius of the wheel in the direction of rotation of the wheel.

* * * * *